INVENTOR:
WALTER P. BAERMANN
BY
ATT'YS

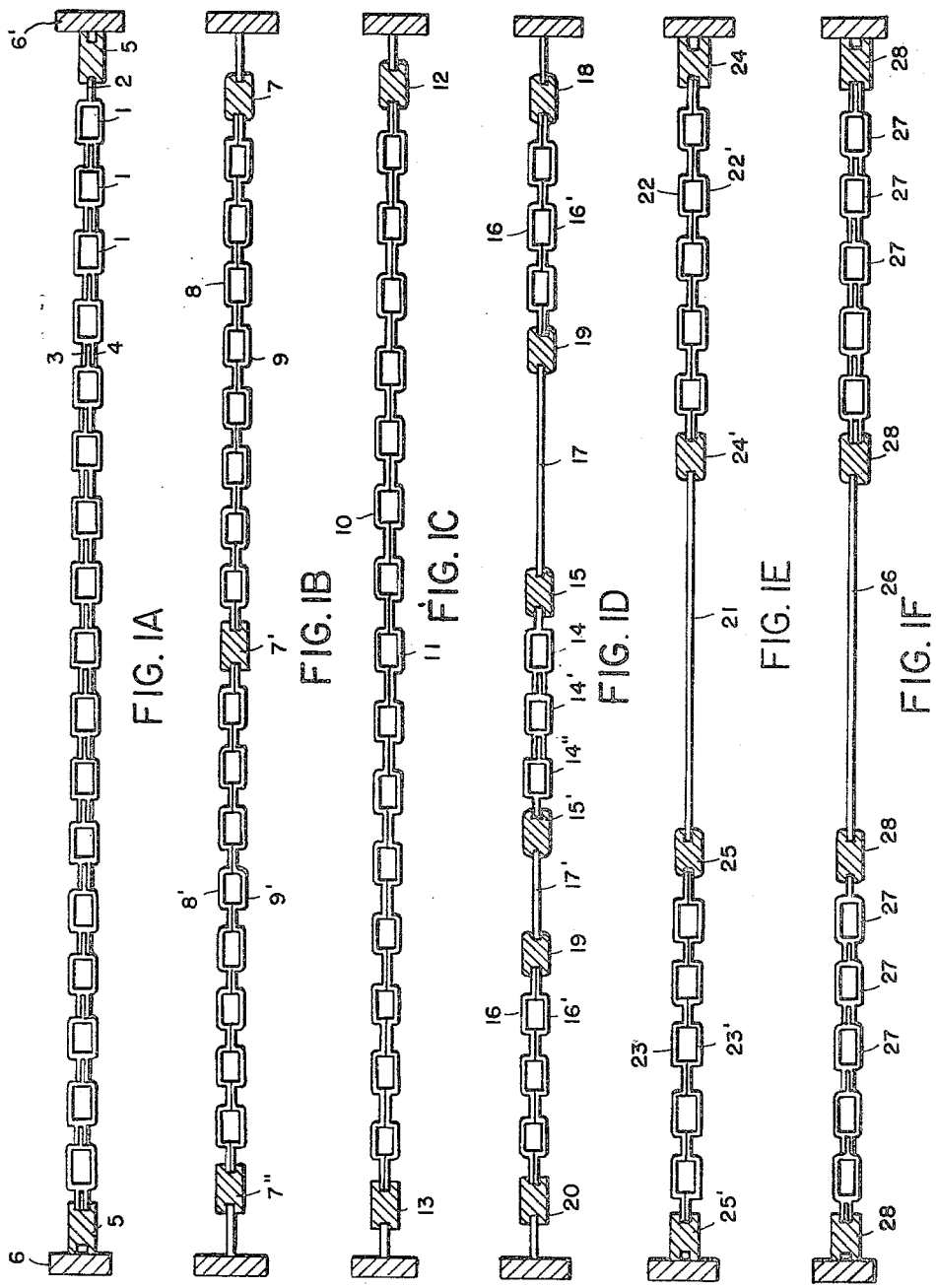

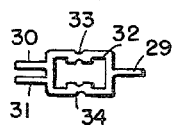
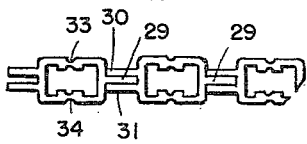
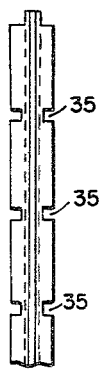
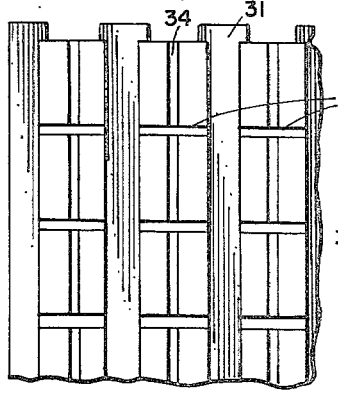
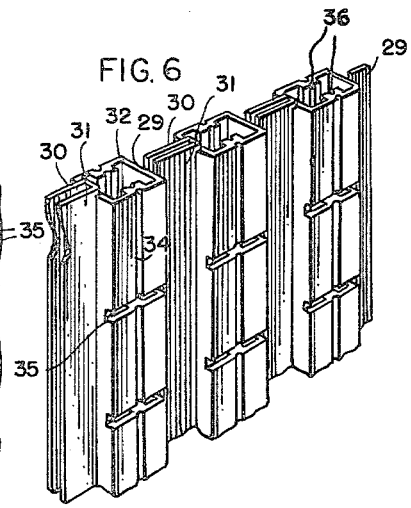
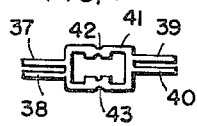
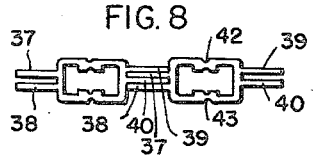
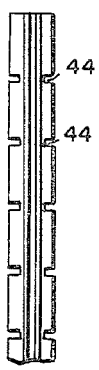
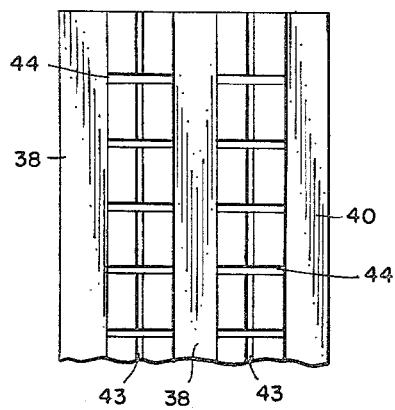
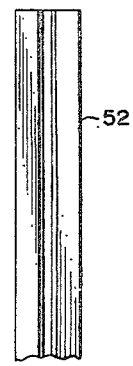
INVENTOR:
WALTER P. BAERMANN May 18, 1965  W. P. BAERMANN  3,184,074
BACKGROUND PANEL STRUCTURE
Filed April 5, 1963  3 Sheets-Sheet 3

United States Patent Office 3,184,074
Patented May 18, 1965

3,184,074
BACKGROUND PANEL STRUCTURE
Walter P. Baermann, 600 Asheville Road,
Waynesville, N. C.
Filed Apr. 5, 1963, Ser. No. 270,920
6 Claims. (Cl. 211—135)

The present invention is directed to novel background or advertising panels. More particularly, the subject invention relates to novel and improved background panels for use in display windows or cases.

At the present time it is customary to use pegboards as a background for display purposes. Shelves and display articles are hung on the pegboard by means of suitable brackets. Although pegboard is an inexpensive material it has no structural strength and, therefore, has to be reinforced. If the pegboard is to be used on two sides, it is necessary to join two pegboard sheets. Another deficiency of pegboard is that it must initially be painted and then repainted to maintain its appearance.

The principal object of the present invention is to provide background panels for use in displaying merchandise and the like which panels have an improved and novel construction.

Another object of the invention is to provide background panels for display windows or cases which can be both decorative and functional.

Still another object is to provide background panel extrusions or sections which are simple to produce and yet have sufficient strength to support relatively heavy display articles.

Another object is to provide a background panel having either an integral color or having transparency or translucency.

A still further object of the invention is to provide panel extrusions or sections which can be joined in a simple manner to provide panels of a given dimension.

Other objects of the invention will become apparent to those skilled in the art from the following detailed description.

In general, the present invention comprises the discovery of a new and improved background panel structure. The panel consists of individual units which can be joined together to form a panel of a given size. Due to the improved design of the panel it is possible to display relatively heavy objects and bulky objects.

The invention can best be understood by reference to the attached drawings in which:

FIGS. 1A, 1B, 1C, 1D, 1E and 1F are top plan views showing six variations of the subject background panels;

FIG. 2 is a top plan view of a single panel extrusion;

FIG. 3 is a top plan view showing three of the extrusions of FIG. 2 in interlocked relationship;

FIG. 4 is an end elevation of a given section of a background panel;

FIG. 5 is a front elevation of the background panel of FIG. 4;

FIG. 6 is a perspective view of the panel of FIGS. 4 and 5;

FIG. 7 is a top plan view of a single panel extrusion having offset interlocking members;

FIG. 8 is a top plan view of two of the extrusions of FIG. 7 shown in interlocked relationship;

FIG. 9 is an end elevation of a panel;

FIG. 10 is a front elevation of the panel of FIG. 9;

FIG. 11 is a top plan view of a support post which can be used in the subject panels;

FIG. 12 is an end elevation of the post of FIG. 11;

Figure 13:
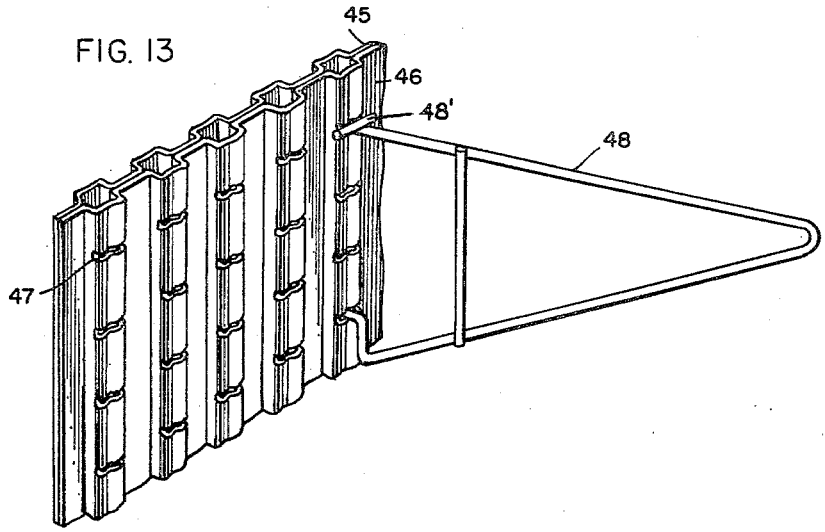
FIG. 13 is a perspective view of another embodiment of the invention.

In FIGS. 1A–1F, six variations of suggested background panels are set forth. In panel A as shown in FIG. 1A, interlocked extrusions 1, 1' and 1" make up the panel. As will be shown more fully below, the individual extrusions are interlocked through the use of tabs 2, 3 and 4. The end extrusions are attached to the sides of the case, window, etc., 6 and 6'. Panel B as shown in FIG. 1B includes support posts 7, 7' and 7" as well as molded sheet sections 8, 8', 9 and 9'. Sheets 8 and 9 and 8' and 9' are joined to form a panel in a manner to be described more fully below. Panel C as shown in FIG. 1C shows elongated sheets 10 and 11 and support poles 12 and 13. The structure of the support poles also will be shown below in greater detail. Panel D as shown in FIG. 1D is a combination of panels A and B in that it includes individual extrusion units 14, 14', 14", posts 15 and 15' as well as elongated and joined sheets 16, 16', and flat display sheets 17 and 17'. This embodiment also includes support posts 18, 19 and 20. Panel E as shown in FIG. 1E is a combination of flat display sheet 21 and elongated panel sheets 22 and 22', 23 and 23' and posts 24 and 24', 5 and 25'. Panel F as shown in FIG. 1F shows a combination of flat display sheet 6 and individual extrusion units 27 and posts 28.

FIG. 2 is a top plan of an individual extrusion unit which can be used in the panels shown in FIGS. 1A, 1D and 1F. The unit includes tongue 29, paired arms 30 and 31, body 32, and indentations 33 and 34. As is evident from this view, the extrusion unit is hollow.

FIG. 3 is a plan view showing three of the units of FIG. 2. As is evident, the tongues 29 fit between the paired arms 30 and 31 of the adjacent unit to form interlocked extrusions.

FIG. 4 is an end elevation of a panel formed from a number of the extrusion units of FIGS. 2 and 3. This view shows openings 35 which provide access to the interior of the units. These openings can conveniently be used to hold brackets or the like.

FIG. 5 is a front elevation of the panel using the extrusion units shown in FIGS. 2 and 3. As was pointed out in connection with FIG. 4, openings or notches 35 are used to support brackets for articles or display devices. Grooves 33 and 34 are perpendicular to the base and reinforce the rigidity of the structure. Internal grooves 36 serve a similar purpose.

The panel can best be visualized by reference to FIG. 6. In this perspective view, arms 30 and 31 are shown surrounding tongue 29. Notches 35 provide access to the hollow interior of hollow body 32. The individual units can either be removed or added to the panel in order to provide a background of satisfactory dimensions.

FIG. 7 shows a modified extrusion unit. Paired arms 37 and 38 are offset somewhat from paired arms 39 and 40. Once again, the unit includes tubular body 41 and reinforcing grooves 42 and 43.

FIG. 8 is a top plan view showing two of the units in FIG. 7 in interlocked relationship.

FIGS. 9 and 10 are end elevation and front elevation respectively showing a partial panel made up of the extrusion units of FIGS. 7 and 8. In FIGS. 9 and 10, notches 44 provide access to the interior of the unit. These notches are adapted to receive brackets for supporting articles.

FIG. 11 is a top plan view of a support post 52 which can be inserted in the panel at particular intervals in order to increase the strength of the unit.

FIG. 12 is an end elevation of the support post.

FIG. 13 is a perspective view of an embodiment of the invention. In this embodiment, panel sheets 45 and 46 are joined together to provide the display panel. The panels ordinarily would be formed of a particular plastic material and are either glued or heat fused to provide a single unit. Notches 47 are cut into each sheet of the panel to provide access to the interior of the individual panel units. The notches are used to hold and support display devices such as bracket 48. A bar 48' welded to bracket 48 serves to prevent turning of the bracket.

Figure 14:
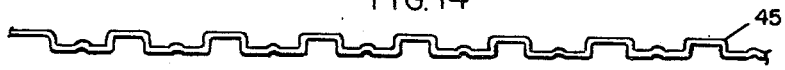
FIG. 14 is a top plan view of a single section of the panel shown in FIG. 13.

FIG. 14 is a top plan view of an individual sheet of the plastic panel of FIG. 13.

Figure 15:
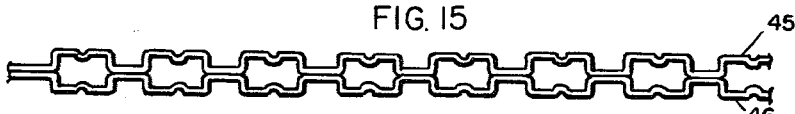
FIG. 15 is a top plan view showing two of the sections of FIG. 14 joined together to form a panel.

FIG. 15 is a top plan view showing two of the sheets of FIG. 14 after they have been joined to form the panel.

Figure 16:
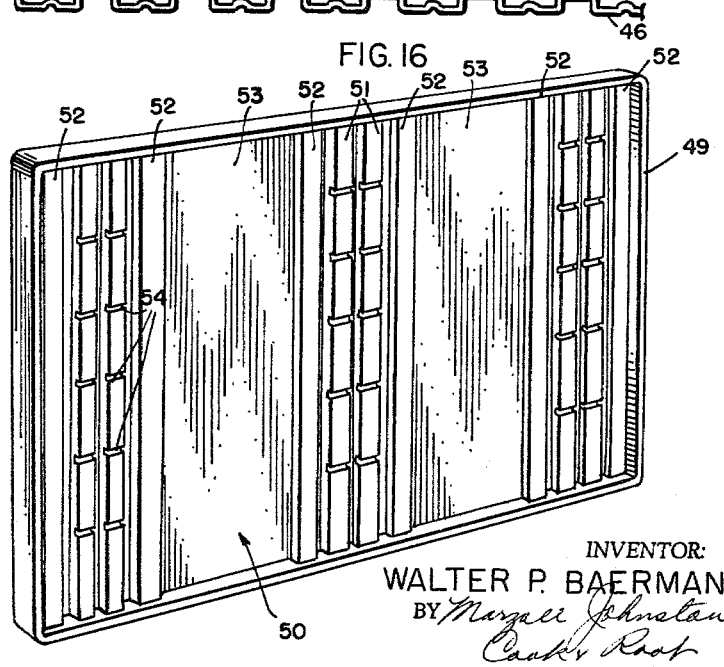
FIG. 16 is a perspective view showing a panel within a case.

FIG. 16 is a perspective view showing one embodiment of the invention as it would appear in a display window or the like. Window housing 49 surrounds and is attached to the display panel 50. Display panel 50 corresponds approximately to panel D of FIG. 1. The panel is made up of individual extrusion units 51, posts 52, and flat panels 53. The individual extrusion units 51 and the posts 52 include openings 54.

As is apparent from the drawing, the subject display or background panel can be used to display a wide variety of merchandise. The combination of display elements can be so designed as to support heavy objects or the full width of the panel could be used to accommodate lighter objects. The individual panel extrusions and the flat sheets make it possible to vary the size of the panel in accordance with the size of the window or other display area. The display can be taken down or put up in a minimum of time simply by lifting out the individual panel sheets or extrusions.

The above described background panels can be fabricated in sheets either by heat forming (e.g., vacuum molding or roll forming) of thermoplastic (e.g., polyethylene or polypropylene) materials or they can be extruded in strips. The slots or openings which are shown in the drawings can be formed by saw-cuts in a second operation.

It will be seen that the invention provides a self-sustaining plastic panel formed with alternate projecting and recessed portions, said projecting portions being hollow and having openings therein adapted to receive brackets for supporting articles. The projecting portions are tubular and the recessed portions are flat. Reinforcing grooves in the projecting portions extend perpendicularly to the base. In one embodiment of the invention, the panel consists of separate front and back members secured together at said recessed portions. In another embodiment of the invention, the panel consists of individual tubular members connected together by tongue and groove members projecting respectively on opposite sides of said tubular members, the tongue and groove connections forming the recessed portions of the panel.

Obviously many modifications and variations of the invention as hereinbefore set forth may be made without departing from the spirit and scope thereof, and therefore only such limitations should be imposed as are indicated in the appended claims.

I claim:
1. An improved background panel which comprises: support posts, individual extrusion units between and supported by said posts, said individual extrusion units including interlocking members, said individual extrusion units being hollow and having openings communicating with the interior of said units, said openings being adapted for receiving shelf supporting brackets and the like, and a panel section between support posts consisting of elongated and joined sheets, said sheets having alternate projecting and recessed portions, said projecting portions being hollow and having openings therein adapted to receive brackets for supporting articles, said recessed portions being flat.

2. An improved background panel which comprises: support posts, individual extrusion units and a flat sheet between and supported by said posts, said individual extrusion units including interlocking members, said individual extrusion units being hollow and having openings communicating with the interior of said units, said openings being adapted for receiving shelf supporting brackets and the like.

3. An improved panel as in claim 2 wherein said individual extrusion units include offset and paired interlocking members.

4. A background structure comprising a self-sustaining plastic panel formed with alternate projecting and recessed portions, said projecting portions being hollow and having openings therein adapted to receive brackets for supporting articles, wherein said panel consists of individual tubular members connected together by tongue and groove members projecting respectively on opposite sides of said tubular members, said tongue and groove connections forming said recessed portions of said structure.

5. A structural element comprising an elongated tubular member having on one side thereof a projecting tongue and on the opposite side a pair of spaced projecting arms, said spaced arms being adapted to engage the projecting tongue of a like structural element to form a panel, and said tubular member having openings therein adapted to receive brackets for supporting articles.

6. A structural element as claimed in claim 5 in which said tubular member has at least one groove formed therein perpendicularly to the base.

References Cited by the Examiner
UNITED STATES PATENTS

| | | | |
|---|---|---|---|
| 2,190,494 | 2/40 | Templin | 29—157.3 |
| 2,250,583 | 7/41 | Krauter | 40—125 |
| 2,388,297 | 11/45 | Slaughter | 29—155 |
| 2,769,553 | 11/56 | Horton | 211—87 |
| 2,954,125 | 9/60 | Husted | 211—90 |
| 3,067,536 | 12/62 | Brittsan | 40—135 |
| 3,102,611 | 9/63 | Mote | 189—34 |

FOREIGN PATENTS 856,548  3/40  France.

CLAUDE A. LE ROY, *Primary Examiner.*